Sept. 1, 1959 R. W. HALBERG ET AL 2,902,130
CLUTCH PLATE
Filed March 19, 1956 2 Sheets-Sheet 1

Inventors:
Robert W. Halberg
and Roger S. Hutton
By: Richard E. Burr
Atty.

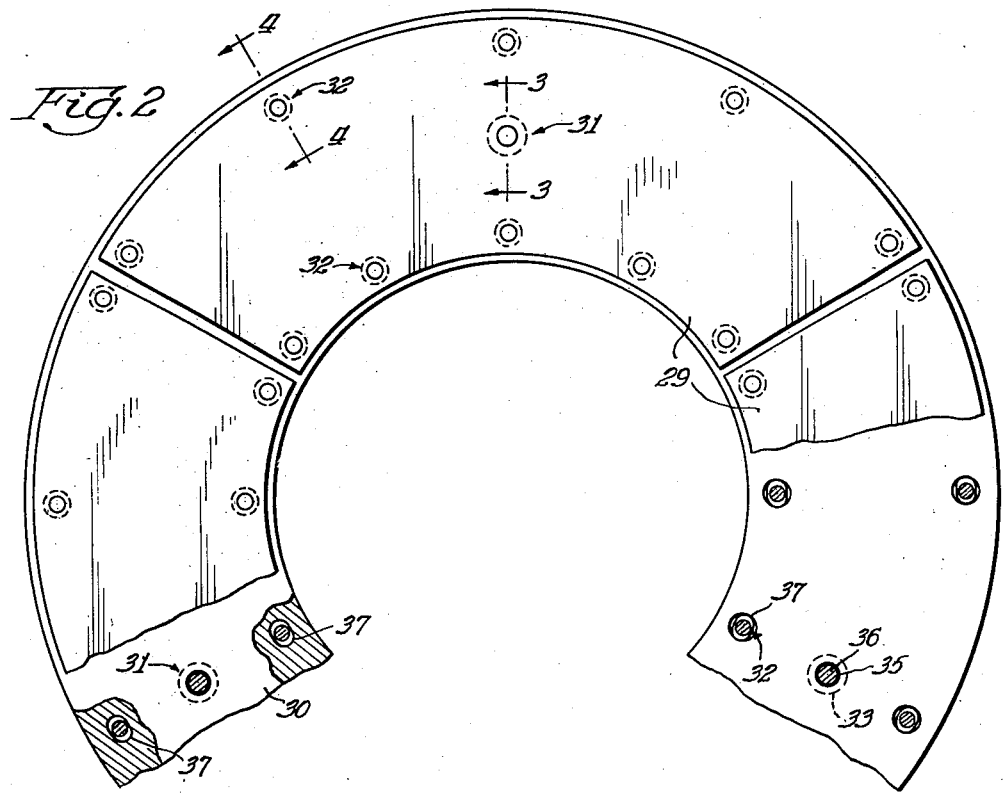
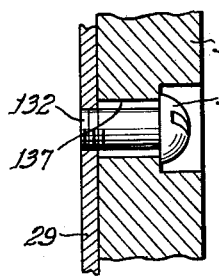
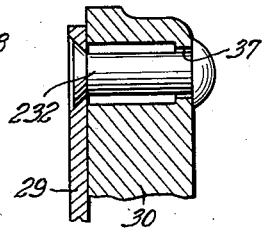
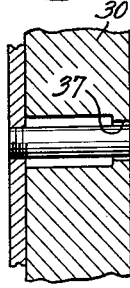
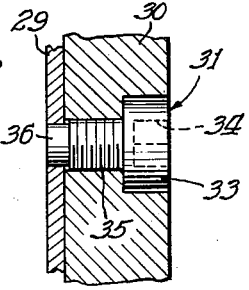

United States Patent Office 2,902,130
Patented Sept. 1, 1959

2,902,130

CLUTCH PLATE

Robert W. Halberg, North Riverside, and Roger S. Hutton, Wheaton, Ill., assignors to Borg-Warner Corporation, Chicago, Ill., a corporation of Illinois Application March 19, 1956, Serial No. 572,302

11 Claims. (Cl. 192—107)

This invention relates to a clutch construction and more particularly to a pressure plate for a friction clutch of the type commonly employed in automobiles and similar vehicles.

A typical friction clutch operates in conjunction with the flywheel or equivalent reaction structure of an internal combustion engine and includes a clutch disc having opposite friction faces engaged between the flywheel and a cast iron pressure plate. Spring means normally urges the pressure plate toward the flywheel to grip the clutch disc and this spring means operates between the pressure plate and cover plate secured to the flywheel for rotation therewith. Means are provided for connecting a clutch throw-out lever mechanism to the pressure plate so that the pressure plate may be retracted, thereby disconnecting the engine from the clutch disc. In many clutches and especially heavy duty clutches for transmitting power from large engines there is a great amount of heat generated by the sliding surfaces much of which is absorbed in the clutch structure. In many instances, both the flywheel and the pressure plate become very hot and internal stresses induced by heating and cooling cause warping or dishing of the pressure plate and the flywheel and checking of the rubbing surfaces of these parts.

It is therefore a general object of the present invention to provide an improved clutch construction wherein the pressure plate and the flywheel will be more resistent to wear and warping or dishing than previous types.

The invention has for another important object the provision of a clutch pressure plate provided with a thin facing which may be of a material different from that of the pressure plate.

Still another object is to provide means for attaching a facing to a pressure plate which will allow limited relative movement between the pressure plate and the facing.

A further object of the invention is to provide a clutch pressure plate which will withstand many engagements and disengagements under severe service conditions without damage.

The foregoing and other desirable objects and advantages of the invention will be readily apparent from the following detailed description of preferred forms of the invention as shown in the accompanying drawings in which:

Fig. 2 is a front elevational view of the pressure plate shown in Fig. 1 with portions broken away;

Fig. 3 is a cross sectional view taken on the line 3—3 of Fig. 2;

Fig. 4 is a cross sectional view taken on the line 4—4 of Fig. 2;

Fig. 5 is a view similar to Fig. 4 showing a modified means for fastening the facing to the pressure plate;

Fig. 6 is a view similar to Fig. 4 showing another means for fastening the facing to the pressure plate;

Although reference will be made herein to a clutch structure particularly adapted for automotive use, it should be understood that the invention has other uses and the present disclosure is intended to be illustrative and not limiting.

Figure 1:
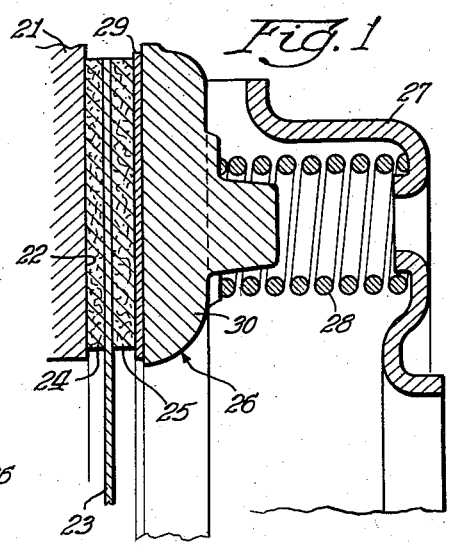
Fig. 1 is a side elevational view partially in cross section of a clutch structure embodying our invention.

The form of the invention disclosed in Fig. 1 is adapted for use in conjunction with a flywheel 21 which is connected to the crank shaft of an internal combustion engine. The flywheel 21 is provided with a rear flat friction face 22. Adjacent the flywheel 21 and adapted to contact the friction face 22 is a driven disc 23 provided with opposite friction facings 24 and 25. A pressure plate 26 in the form of an annulus is engageable with the friction facing 25. A cover structure 27 (only partially shown in the drawing) encases the pressure plate 26 and the flywheel 21 and is adapted for rotation therewith.

Housed within the cover structure 27 are a plurality of springs 28 normally functioning to urge the pressure plate 26 towards the flywheel 21 to grip the friction facings 24 and 25 of the driven disc 23 therebetween.

Figure 8:
Fig. 8 is a cross sectional view of a standard pressure plate with the dished position shown in dotted lines.
Figure 9:
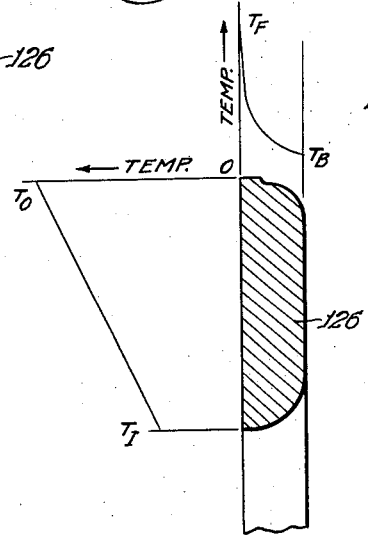
Fig. 9 is a cross sectional view of a portion of a standard pressure plate with a graph showing temperature gradients.

The pressure plate 26 shown in Fig. 1 is provided with a facing 29 that will be more fully described later in the specification. The standard type of pressure plate 126 is shown in Figs. 8 and 9 and comprises a heavy annulus of cast iron with one face ground to a flat rubbing surface. It has been found that after extreme use, this type of pressure plate tends to "dish," that is, it takes the conical shape shown in dotted lines in Fig. 8 and also the rubbing surface becomes heat checked with small cracks appearing in said surface. Experiments have indicated that dishing and heat checking are due partially to the steep temperature gradient between the rubbing face and the back face of the pressure plate when the clutch is operated under cyclic engaging conditions with cooling periods between cycles. This steep temperature gradient is developed because in a single plate clutch, the rubbing or slip occurs on one side of the pressure plate only and consequently, this face receives the total energy of the slip in the form of heat. Because cast iron is a relatively poor heat conductor the rubbing face of the pressure plate becomes very hot while the back face remains relatively cool.

The temperature gradient for a typical pressure plate is shown graphically in Fig. 9 wherein $T_F$ designates the temperature of the rubbing face and $T_B$ the temperature of the back face of the pressure plate. It will be noted that the temperature near the rubbing face is much higher than the temperature near the rear of the plate.

In the standard pressure plate if the clamping pressure is uniformly distributed, there is also a non-uniform heating input in a radial direction due to the fact that the linear slip velocity at any point on the rubbing face is directly proportional to its radial distance from the clutch axis and consequently, the outer portion of the rubbing surface receives a greater proportion of the total energy input than does the inner portion of said surface.

This temperature gradient caused by the radial difference is shown graphically in Fig. 9 wherein $T_I$ designates the temperature at the inside edge of the standard pressure plate while $T_O$ designates the temperature at the outside edge.

It should be noted that if the pressure plate dishes then the temperature of the outside of the clutch plate would be even higher since the clamping pressure would be highest on the outside edge.

In addition to these over-all temperature gradients there also exist local gradients due to high and low spots on the rubbing surface.

Since the above conditions exist it is our theory that pressure plate dishing and heat checking occur in the following manner: with the steep temperature gradient between the back and front of the plate, the rubbing surface tends to assume a convex shape because it is hotter and tends to expand more than the back surface of the pressure plate. However, due to the resistance of this change in shape provided by the clutch clamping action and the relatively high rigidity of the cool, heavy back section of the pressure plate, the plate cannot assume a convex shape. Therefore, certain stress conditions are set up in which the very hot material of the rubbing surface is subjected to heavy compressive stress. Because the cast iron has little strength when hot, the rubbing surface undergoes plastic flow. Upon cooling the rubbing surface material contracts thereby putting the surface material in tension and causing dishing with the front face concave.

The temperature gradient between the inner and outer peripheries of the pressure plate aids in producing dishing of said plate.

The local high spots in the friction surface cause heat checking because they are hotter and tend to expand more than the surrounding areas. This expansion is resisted by the stronger, larger, cooler sections so that heavy compressive stress is set up in the hot parts. The resulting plastic flow of the hot material causes severe tensile stress upon cooling; and the cast iron being notoriously weak in tension soon fatigues after a number of heating and cooling cycles. These fatigue failures take the form of small regularly spaced surface cracks which may cause premature failure of the pressure plate.

We have solved the problem of pressure plate dishing by the clutch structure shown in Figs. 1 and 2. On the front of a cast iron annulus 30 is affixed a relatively thin segmented facing 29. The annulus 30 is similar to a standard pressure plate except that it is thinner by the width of the facing. Therefore, the over-all dimensions of the improved pressure plate may be the same as those of the standard pressure plate and the two may be interchangeable.

The facing 29 comprises a plurality of segments secured to the annulus 30 so that the segments may expand or contract without applying appreciable stress to the annulus. One attaching means for each segment as is shown in Figs. 2, 3, and 4 comprises a single, centrally located large diameter dowel 31 which takes the majority of the shear load at the junction between the segmented facing 29 and the annulus 30; and a plurality of relatively small diameter studs 32 which hold the facing against the annulus 30. The dowel 31 may be in the form of a large stud provided with a head 33 having a socket 34 so that it may be turned by a suitable wrench. A threaded shank portion 35 is closely fitted in an opening in the annulus 30 and the unthreaded stud end 36 is closely fitted in the facing 29 with its extreme end flush with or below the facing surface. A plurality of relatively small diameter studs 32 are spaced near the outer periphery and the inner periphery of the facing 29. As shown in Fig. 4, an opening 37 slightly larger than the stud shank is drilled in the annulus for each stud and then this opening is counter-bored to allow a large clearance for most of the lower portion of the stud shank and a smaller clearance for the portion of the shank near the head 38. The smaller diameter of the opening 37 may be oval in shape as is shown in Fig. 2 if desired with the longer axis of the oval approximately perpendicular to the radius of the annulus 30. Ten studs 32 for each segment have been found satisfactory for a 14 or 15 inch pressure plate.

Other fastenings that may be used instead of studs 32 are shown in Figs. 5 and 6. In Fig. 5 a short stud 132 is shown fitted in an aperture 137 in the annulus 30. The aperture 137 provides clearance for the stud shank and the portion of the aperture 137 toward the rear of the annulus is enlarged so that stud head 38 may enter therein. In Fig. 6 the aperture 37 in the annulus 30 is of the same shape as that of Fig. 4. A rivet 232 with a shank diameter that allows clearance in the smallest portion of the opening 37 secures the facing 29 to the annulus 30. It is also possible to weld the stud end to the segment instead of riveting it.

In the operation of the clutch structure described above, the large dowel 31 takes most of the shear load at the junction between the segmented facing 29 and the annulus 30. The shear load in this case is due to frictional drag on the rubbing surface. The central location of the dowel 31 in the center of the facing 29 allows the facing segment to expand or contract in all directions without producing undue stress on the thin facing 29 around the dowel end 36.

The relatively small studs 32 hold the segmented facings 29 against the annulus 30 but are free to move in their apertures or even bend if there is a change in shape or size of the facing due to thermally induced stresses or strains. This construction makes it impossible to obtain residual stresses in the annulus 30 of a magnitude that would normally cause dishing.

The use of a plurality of segments for facing 29 instead of a solid ring or facing material is also an important contribution to the success of our improved pressure plate. Each segment may expand laterally without causing buckling since the space between segments allows such expansion. Because of our novel fastenings each segment may also expand radially. Furthermore, the junction between the annulus 30 and the facing segments 29 acts as a heat dam so that the thin facing 29 after a few engaging cycles achieves a relatively uniform temperature. This is particularly true after an oxide layer has been formed between the facing 29 and the annulus 30.

Although it might appear that a slotted rubbing surface on the pressure plate would damage the driven disk, our experiments have shown that the slotted plate causes no more damage or increased wear than is caused by an unslotted rubbing surface on the pressure plate. However, the slotted plate is superior to the unslotted plate in resisting dishing.

Figure 10:
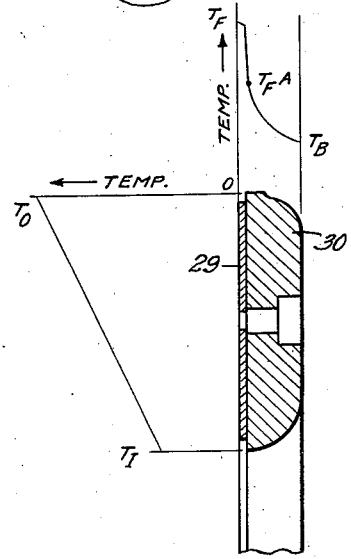
Fig. 10 is a cross sectional view of a portion of our improved pressure plate with a graph showing temperature gradients.

In Fig. 10 is shown a typical temperature gradient for our improved pressure plate with a segmented facing wherein $T_B$ indicates the temperature at the back of the annulus 30, $T_FA$ the temperature at the front of the annulus and $T_F$ the temperature at the front of the facing 29. It will be noted that the temperature differential in the annulus 30 is much less than that shown for the standard pressure plate in Fig. 9. It will also be noted that the temperature in the facing segment is fairly uniform.

We have found that hot rolled steel or cold rolled steel facings 29 are most satisfactory for working against a friction surface of sintered metal, ceramic, or a combination of metal and ceramics. Copper facings 29 are excellent for use against asbestos friction material. The use of a ductile metal facing such as copper practically eliminates any heat checking or cracking. This is due to the fact that the ductile material is more resistant to tensile failure than cast iron and also because of reduced thermal stresses in the segmented facings. The ductile material should be ductile over the entire clutch operating temperature range.

Figure 7:
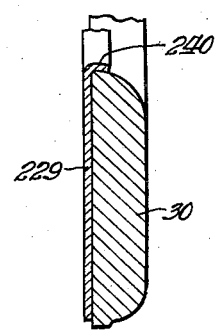
Fig. 7 is a cross sectional view of the pressure plate showing a modified facing.

As is shown in Fig. 7, a facing segment 229 may be formed with a portion at an angle to its face to provide a lip 240 to hook on the inside periphery of the annulus 30. This provides a fastening in addition to the center dowel 31 and the studs 32 and yet allows sufficient expansion of the facing for most uses.

Although this invention is particularly adapted to the pressure plate of a clutch the segmented facing with its improved fastening means may also be used to provide the rubbing surface for the flywheel 21.

The general arrangement of the clutch construction illustrated and described is such that the assembly is structurally compact and highly efficient from the standpoints of manufacture and operation. It will be understood of course, that the structures illustrated an described are only preferred embodiments of the invention and it is intended to cover all alterations and modifications thereunder as fall within the spirit and scope of the invention as claimed in the appended claims.

What is claimed is:

1. A pressure plate for a friction clutch comprising a heavy metal annulus, a thin facing of ductile material for said annulus and means securing said thin facing to said annulus including fastenings having portions passing through openings in said annulus which portions are substantially smaller than said openings for preventing axial separation of said facing from said annulus but permitting relative lateral movement between said facing and said annulus.

2. A pressure plate for an axially engaging friction clutch comprising a heavy metal annulus, a thin copper facing for said annulus and means securing said thin copper facing to said annulus including fastenings having portions passing through openings in said annulus which portions are substantially smaller than said openings for preventing axial separation of said facing from said annulus but permitting relative lateral movement between said facing and said annulus.

3. A pressure plate for a friction clutch comprising a heavy cast iron annulus, a thin steel facing for said annulus and means securing said thin steel facing to said annulus including fastenings having portions passing through openings in said annulus which portions are substantially smaller than said openings for preventing axial separation of said facing from said annulus but permitting relative lateral movement between said facing and said annulus.

4. A pressure plate for a friction clutch comprising a metal annulus, a plurality of facing segments and means for attaching each of said facing segments to said annulus including a fastening laterally locating said segment on the annulus and other fastenings having shank portions positioned in openings in said annulus, with at least a portion of said openings being larger than said shank portions for preventing axial separation of said segments from the annulus but permitting relative lateral movement between said segment and the annulus.

5. A pressure plate for a friction clutch comprising a heavy metal annulus, a plurality of thin facing segments spaced around said annulus and means for attaching said facing segments to said annulus including locating fastenings laterally locating each segment on the annulus and other fastenings spaced from said locating fastenings and having portions passing through openings in said annulus which portions are smaller than said openings for preventing axial separation of said segment from the annulus but permitting relative lateral movement between said segments and the annulus.

6. A pressure plate for a friction clutch comprising a heavy metal annulus, a plurality of metal facing segments and means for attaching said facing segments to said annulus at spaced intervals including a single locating fastening securing each segment against lateral movement on the annulus at one central point of each segment and other fastenings having shank portions positioned in openings in said annulus, said shank portions being smaller than the surrounding openings permitting relative lateral movement but preventing relative axial movement between said segment and said annulus whereby said segment may expand from said central point independently of the annulus when heated.

7. A pressure plate for a friction clutch comprising a heavy metal annulus, a plurality of thin metal facing segments and means for attaching said facing segments to said annulus at spaced intervals including a locating dowel for each segment preventing lateral movement between said segment and said annulus at one point and other fastenings having shank portions positioned in openings in said annulus, said openings being larger than said shank portions for preventing axial separation of each segment from said annulus but permitting relative lateral movement between said segment and the annulus at other points.

8. A pressure plate for a friction clutch comprising a annulus, a thin metal facing and means securing said metal facing to said annulus so that the metal facing may expand and contract independently of the expansion and contraction of said annulus including a plurality of fastenings having shank portions positioned in openings in the annulus, said openings being larger than said shank portions to allow lateral movement of said shank portions in said openings.

9. A pressure plate for a friction clutch comprising a heavy metal annulus, thin metal facing segments and means holding said facing segments against said annulus so that said facing segments may expand and contract independently of the expansion and contraction of said annulus including means for locating one portion of each of said segments on the face of said annulus and a plurality of headed studs having their shanks positioned in openings in said annulus with at least a portion of said openings being spaced from the stud shanks to allow lateral movement of said studs in said openings as said segments expand or contract; said studs being provided with screw threads which engage cooperating threads in said segment to prevent axial separation of said segment from said annulus.

10. A pressure member for a friction clutch comprising a heavy metal annulus, thin metal facing segments for said annulus and means to hold each of said segments against said annulus whereby said segment may contract and expand independently of said annulus but is prevented from axially separating therefrom including a locating member for laterally locating a portion of said segment on said annulus and a plurality of headed rivets with their shanks positioned in openings in said annulus, said rivet shanks being substantially smaller than the portion of said openings adjacent the face of said annulus and with the expanded heads of said rivets in countersunk openings in said segment.

11. In a friction clutch, a pressure member comprising a heavy metal annulus, a plurality of thin metal segments having a portion formed at an angle with the face of said annulus and hooked over the inner periphery of said annulus, and means fastening said segments to said annulus including fastenings having shank portions positioned in openings in the annulus, said openings being larger than said shank portions to allow lateral movement of said shank portions in said openings to prevent axial separation of said segment from the face of said annulus but allowing said segment to expand and contract independently of the expansion and contraction of said annulus.

References Cited in the file of this patent

UNITED STATES PATENTS

| | | |
|---|---|---|
| 1,702,000 | Gibson | Feb. 12, 1929 |
| 2,163,152 | Palm | June 20, 1939 |
| 2,172,503 | Fies | Sept. 12, 1939 |
| 2,674,359 | Du Rustu | Apr. 6, 1954 |
| 2,812,841 | De Simone | Nov. 12, 1957 |
| 2,822,906 | Wisman | Feb. 11, 1958 |